United States Patent [19]
Brown, II

[11] Patent Number: 4,951,922
[45] Date of Patent: Aug. 28, 1990

[54] APPARATUS FOR EXTRACTING BRUSH WITH A TRACTOR

[75] Inventor: Austin E. Brown, II, Beeville, Tex.

[73] Assignee: Brown, Beasley & Associates, Inc., San Antonio, Tex.

[21] Appl. No.: 447,207

[22] Filed: Dec. 7, 1989

[51] Int. Cl.⁵ .............................................. E21B 19/00
[52] U.S. Cl. ..................................... 254/124; 254/132
[58] Field of Search ................... 254/132, 124, 30–31, 254/29 R; 37/2 R; 144/34 R, 2 N

[56] References Cited

U.S. PATENT DOCUMENTS

| 2,482,950 | 9/1949 | Toftey | 254/30 |
| 2,535,054 | 12/1950 | Ernst et al. | 254/132 |
| 4,067,369 | 1/1978 | Harmon | 254/132 |
| 4,256,286 | 3/1981 | Hudgins | 254/30 |

Primary Examiner—Robert C. Watson
Attorney, Agent, or Firm—Thomas E. Sisson

[57] ABSTRACT

An apparatus for pulling or extracting ts brush, plants and the like. The apparatus has a frame for attachment to the standard three-point hitch mechanism of a tractor and a puller assembly pivotally attached at an elevated end to the frame. The apparatus and method uses the leverage principle to extract plants while the tractor is driven forward. The apparatus has a back member, a foot portion including toe and heel sections, a movable jaw, a sharpened engagement plate, plant guide tangs, and meshing fingers. The apparatus and method imparts both vertical and horizontal forces to the plant during the extraction process.

8 Claims, 4 Drawing Sheets

APPARATUS FOR EXTRACTING BRUSH WITH A TRACTOR

BACKGROUND OF THE INVENTION

This invention relates to an agricultural implement and method, more particualrly to an attachment for tractors and the like for mechanically pulling woody plants having extensive root systems from the ground, and even more specifically for extraction of the extended tap root of the Huisache and other plants.

Improved pastureland may become heavily invaded by the woody, throny, Huisache and Mesquite plants which grow generally vertically with a long tap root extending into the ground. The Huisache and Mesquite create not only problems for grazing animals, but also rob the soil of precious moisture necessary for the proper growth of pastureland grasses. Further, the Huisache is thickly branched and often shades out the grass. All of these problems are amplified in regions where there is minimal rainfall or where drought conditions exist.

There have been a number of methods and apparatuses utilized to remove or eliminate the Huisache and Mesquite plants, all of which are costly either in terms of money, labor, or environmental impact. One current method of removal employs the use of a D-8 caterpillar tractor with a root plow. The plow digs into the ground and severs the tap root beneath ground level, the plow continues to disturb the soil and the plant is turned over. A root rake then is employed to rake and stack the plants for subsequent burning. The technique is costly monetarily and results in excessive damage to the grass turf.

Another technique used is hand or mechanical grubbing. A grubbing hoe or small grubbing plow is used to cut the tap root below the ground and may be only effectively used when the plants are small and the soil is sufficiently moist. Unfortunately, the tap root is usually not fully extracted and the plant later reemerges thicker and more troublesome. The hand grubbing technique is incredibly time and labor intensive and must be done when the plants are small. Mechanical grubbing greatly disturbs the soil, and, like hand grubbing, leaves root remnants to re-emerge. Oftentimes acreage is heavily infested with the Huisache plant at the time it is converted to pastureland, making the hand grubbing technique unacceptable.

Yet another method which is gaining popularity is the use of herbicides. This technique has the disadvantages of being monetarily costly and environmentally unsatisfactory.

While many brush and tree pullers have been developed, none has been as suitable as the present invention for use in extracting the Huisache and Mesquite plants. U.S. Pat. No. 2,505,923 discloses a tree or brush puller with gripping jaws which are engagable around a tree trunk. The tractor is driven forward and a horizontal pulling force is applied to the tree. With the Huisache plant use of the puller of U.S. Pat. No. 2,505,923 is not effective because there is no initial vertical lift on the plant to initiate the dislodgement of the long tap root found in the Huisache plant. Further, the jaws of the '923 device generally apply clamping forces to the sides of the tree, or in a direction perpendicular to the movement of the pulling tractor. This arrangement of forces results in considerable slippage of the jaws upwardly along the sides of the tree during removal.

Another tree or bush pulling apparatus is shown in U.S. Pat. No. 3,057,599. With such an apparatus the to be removed tree is grasped by gripping jaws and a hydraulic cylinder is actuated to cause linkages to lift the tree vertically. The arms of the apparatus of U.S. Pat. No. 3,057,599 are pivotally attached to the lower frame of the tractor and the hydraulic cylinder must exert sufficient force to lift the tree creating an opposing force tending to lift the front end of the tractor.

Many other pullers are known but they are much more complicated, costly to build, and require excessive maintenance. Examples of such pullers may be seen in the following U.S. Pat. Nos.: 2,535,099; 2,535,054; 3,427,640; 3,208,726; 3,311,350; 4,706,935; 3,823,916; 3,958,613; 2,436,510; 4,067,369; and 3,802,663. Despite the existence of these devices and such efforts aimed at extraction of trees and brush, the problems of removing the Huisache and Mesquite plants have continued to plague farmers and ranchers.

The present invention offers an inexpensive and easy-to-use solution to this long-standing problem.

SUMMARY OF THE INVENTION

The present invention is an apparatus and method for extracting brush, plants, trees and the like. The apparatus is releasably attachable to a tractor having a three-point hitch mechanism or assembly. A frame is attachable to the hitch mechanism and a puller assembly is pivotally attached at only one point to the frame. The puller assembly is attached to the frame at an elevated pivot point and has a foot portion and toe section which is below and extends forward the pivot point. The puller further has a movable jaw and a sharpened base plate which engage and grasp the plant to be removed. Once the plant is engaged, the puller foot portion is placed on the ground, the jaws shut, and the tractor is driven forward. As the tractor moves forward, the puller assembly is levered, rotating and pivoting about the pivot point and the toe section. The long tap root of the plant is impacted by both vertical and horizontal force components, thereby easily extracting the plant with full root system intact.

DETAILED DESCRIPTION OF THE PREFERRED EMBODIMENT

Figure 1:
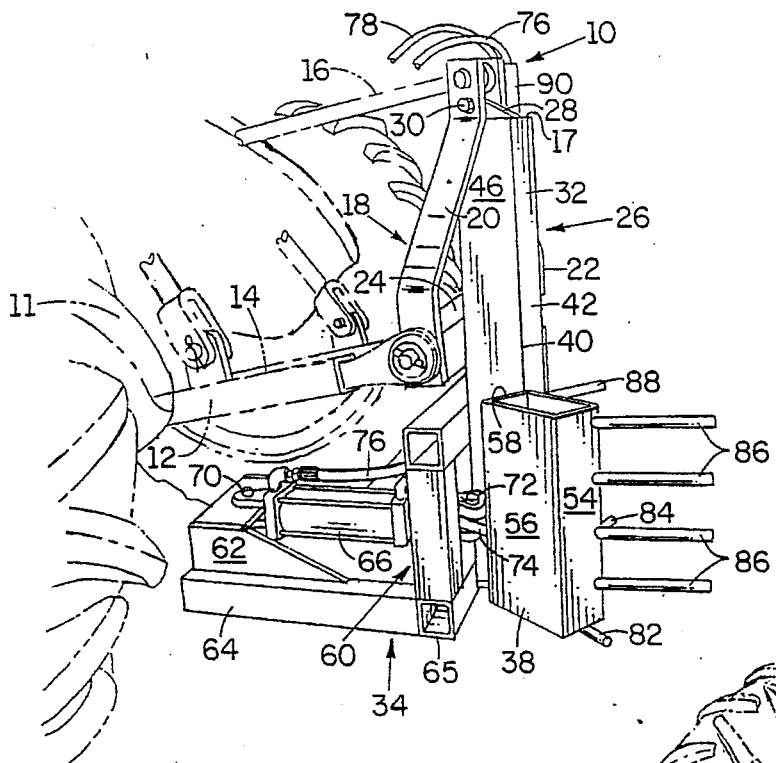
FIG. 1 is a left side perspective view of the present invention with the tractor and hitch mechanism shown in broken lines.

FIG. 1 illustrates the attachment of the present invention 10 to the standard three-point hitch lift mechanism of a tractor 11 having a standard remote cylinder hydraulic power supply system. The function and operation of the three-point hitch and the remote hydraulic system are well known in the art. Basically the three-point hitch utilizes two lower, generally rearward, horizontally extending lift arms 12 and 14 and a rearward and generally slightly upward extending upper guide arm 16 (shown in broken lines). By operation of the vehicle's three-point lift system arms 12 and 14 may be slightly raised and lowered in the conventionally known manner. Guide arm 16 merely functions to provide a third point of connection and does not provide any lifting force. With the present invention, arms 12 and 14 are not used to provide the lifting force to extract the plant (as will be discussed further).

The present invention 10 is removably attachable to the three-point hitch by a generally triangular shaped frame member 18. Sides 20 and 22 of frame 18 extend upward from frame base 24. As can be seen in FIG. 1, the lower lift arm 12 is attached to the bottom of side 20 while guide arm 16 is attached to the top of side 20. In the same way, lift arm 14 is attached to the bottom of side 22 and guide arm 16 is attached to the top of side 22. Thus frame 18 is attached at its upper peak to guide arm 16 and at its base by the lower lift arms 12 and 14. Frame 18 may be raised and lowered by operation of the tractor's three-point hitch lift system.

The topmost end 17 of puller assembly 26 is pivotally attached by pivot arm 28 to frame 18 at approximately the upper intersection of sides 20 and 22 opposite base 24. Puller assembly pivot arm 28 has an aperture adapted to receive any standard fastener 30 which extends through an opening in side 20, through the aperture in pivot arm 28 and through an opening in side 22. Thus puller assembly 26 may freely pivot toward and away from frame base 24 as will be discussed further below.

Puller assembly 26 has a generally reverse L-shape with a vertical back member 32 and foot portion 34. Pivot arm 28 is attached to the top of back member 32. Back member 32 is a rectangularly shaped box having flat front face 42, flat back side 44, flat left side 46, and flat right side 48. A movable jaw 38 is hingedly attached to the lower portion of back member 32 by hinge 50. Movable jaw 38 is also a rectangularly shaped box having an engagement face 52, a left side wall 54, an outer wall 56, and a right side wall 58. Hinge 50 runs along the left side-front face edge of back member 32 and the right side wall-engagement face edge of movable jaw 38.

Figure 2:
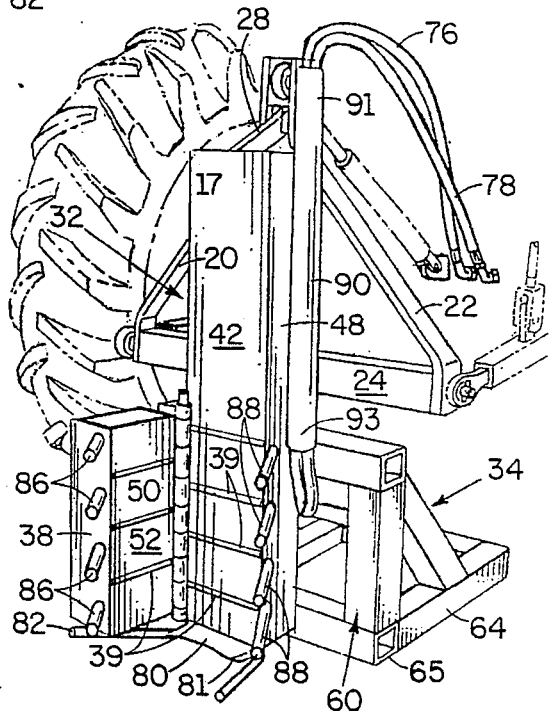
FIG. 2 is a right side perspective view of the present invention showing the jaw in the open position.

As will be discussed further, when jaw 38 is closed, engagement face 52 of jaw 38 is pressed generally flat against front face 42 of back member 32 with the plant to be removed held ridigly between the two faces. As can be seen in FIG. 2, steel ridges 39 are formed on faces 42 and 52 by welding bars horizontally across the faces.

Foot portion 34 includes open-construction frame 60 constructed of square tubing or box iron which is securely affixed to the flat back side 44 of back member 32. Frame 60 is appropriately reinforced and gusseted to withstand the stress of operation. Frame 60 has a mounting bracket 62 welded or otherwise securely affixed to a toe section 64 of frame 60. Heel 65 of foot 34 is opposite toe section 64. Hydraulic cylinder 66 with rod 68 is mounted at a first end 70 to bracket 62. Rod 68 is extendible from cylinder 66 and has a clevis mounting clamp 72 threaded onto the end of rod 68. Clevis 72 is pivotally attached to jaw connector lug 74 attached to the side edge of jaw 38. Cylinder 66 is operable by flow of hydraulic fluid through feed lines 76 and 78 which are in turn connected to the remote hydraulic cylinder power supply of the tractor 11.

Figure 3:
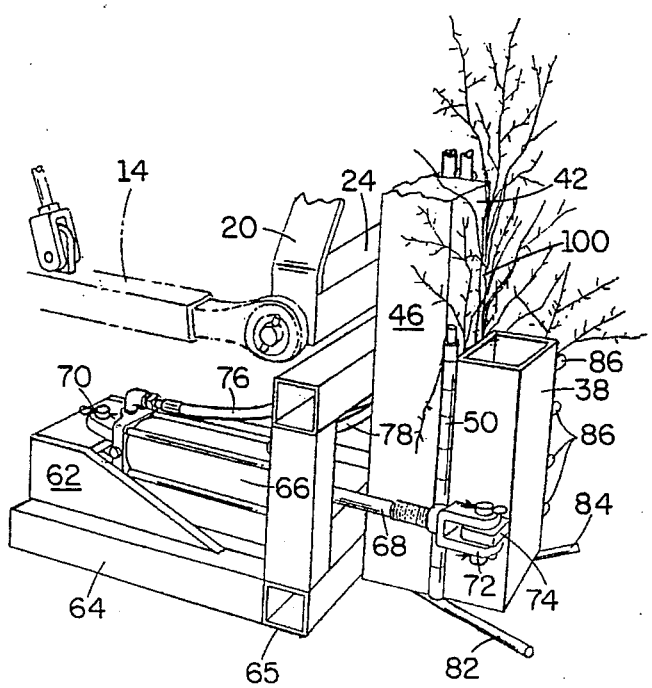
FIG. 3 is a perspective view showing the invention closed around a plant with the foot flat on the ground.

As can be seen in FIGS. 1 and 3, foot portion 34 can freely swing or pivot because it is not connected directly to the base 24, but is rather pivotally connected to the upper frame near guide arm 16 through pivot arm 28 at the top of back member 32. Toe section 64 extends forward and below pivot arm 28. This is an important feature to the effective operation of the present invention.

Turning to FIG. 2, it will be noted that a sharpened plate 80 extends outwardly and rearwardly from front face 42 at the bottom of back member 32. Plate 80 has a slightly downward tilt toward the ground and has an upwardly beveled leading edge 81. Plate 80 extends below jaw 38 so that there is no interference with the closure of jaw 38 during operation of the apparatus. Guide tangs 82 and 84 are further attached to the bottom of back member 32 and are for assisting the operator of the apparatus in ensuring that the base of the plant to be extracted is brought into engagement with plate 80 when the tractor is backed up to the plant.

Extending angularly outward from right side wall 54 of jaw 38 and left side 48 of back 32 are a multiplicity of rigid fingers 86 and 88, respectively. Fingers 86 and 88 cooperate to mesh during closure of jaw 38 to trap and hold the branches of the plant to be extracted.

Attached to left side 48 of back 32 is a hydraulic line protection tube 90 through which pass feed lines 76 and 78. Tube 90 has an upper end 91 which extends above pivot arm 28 and a lower end 93 which extends below the level of base 24. This ensures that the feed lines are not pinched during rotation and swinging movement of puller assembly 26 in the extraction process.

The process for extracting plants involves opening jaw 38, backing the tractor up to the plant 100 to be extracted until the base 102 of the plant engages plate 80. The foot portion 34 of the apparatus 10 is lowered to the ground by the tractor's three-point lift system and jaw 38 is closed by operation of the hydraulic cylinder 66 (see FIG. 3). It will be noted that should the operator not fully engage the plant when backing the tractor up, the closing of jaw 38 will draw the puller assembly back into full engagement because the puller assembly 26 is free to pivot about arm 28. Incomplete engagement is often a problem with other devices, because when there is not full engagement, the plant will slip out of the grasping mechanism. This does not happen with the present invention.

Figure 4:
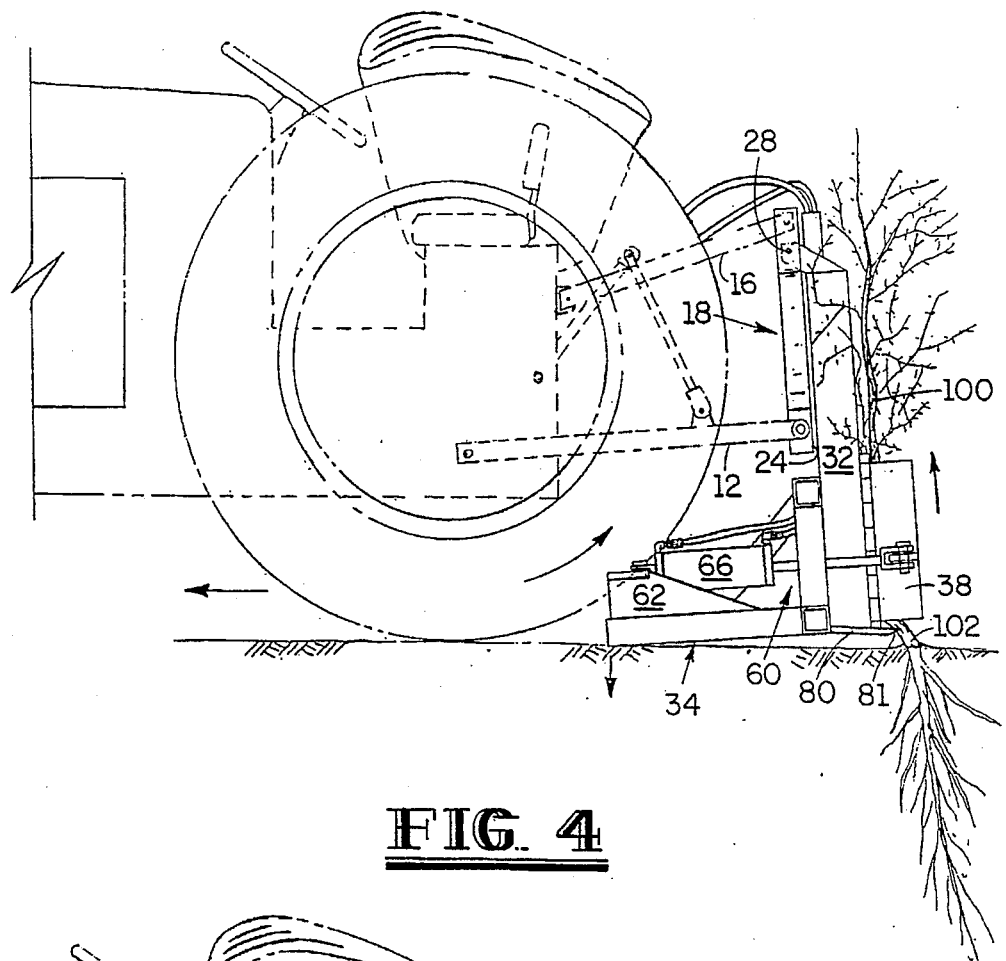
FIG. 4 is a side perspective view showing the present invention during initial forward movement of the tractor.
Figure 5:
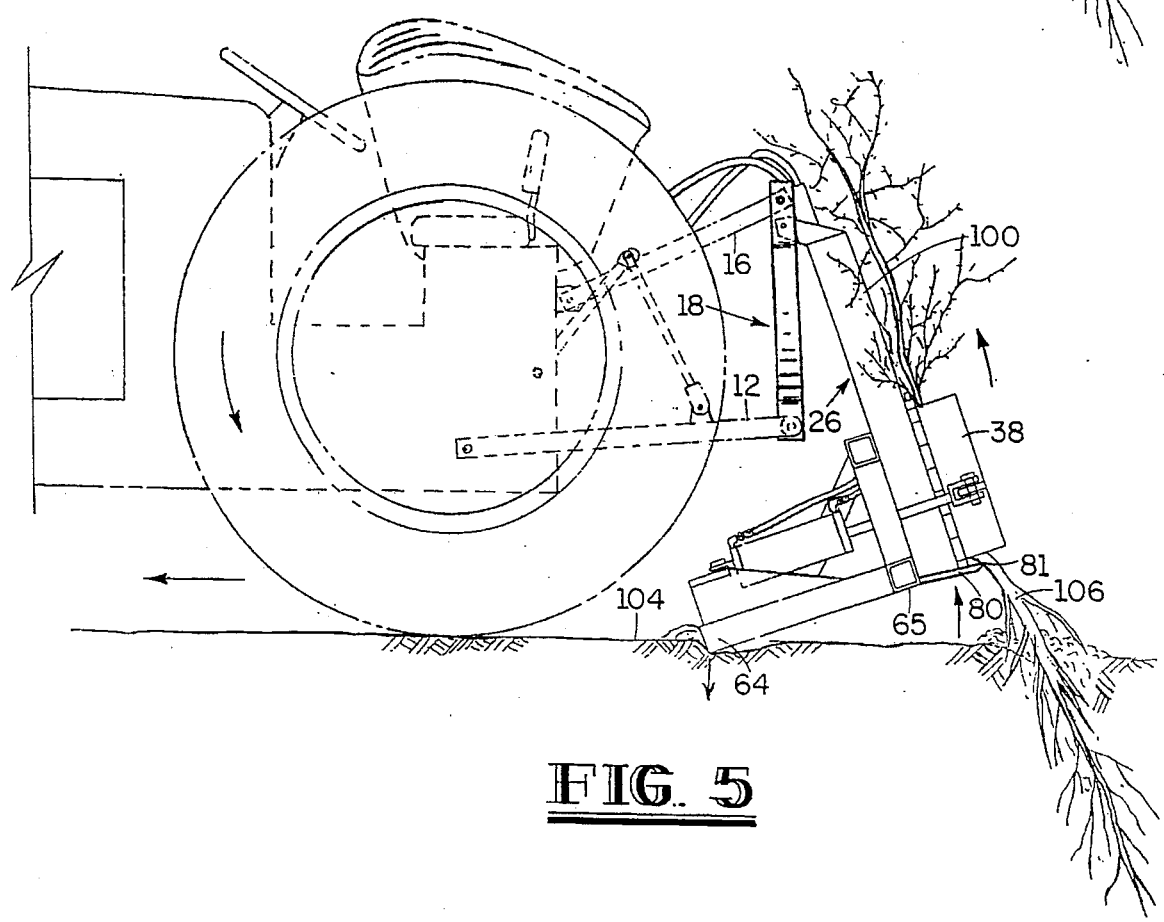
FIG. 5 is yet another side perspective view of the present invention with the tractor moved even further forward.
Figure 6:
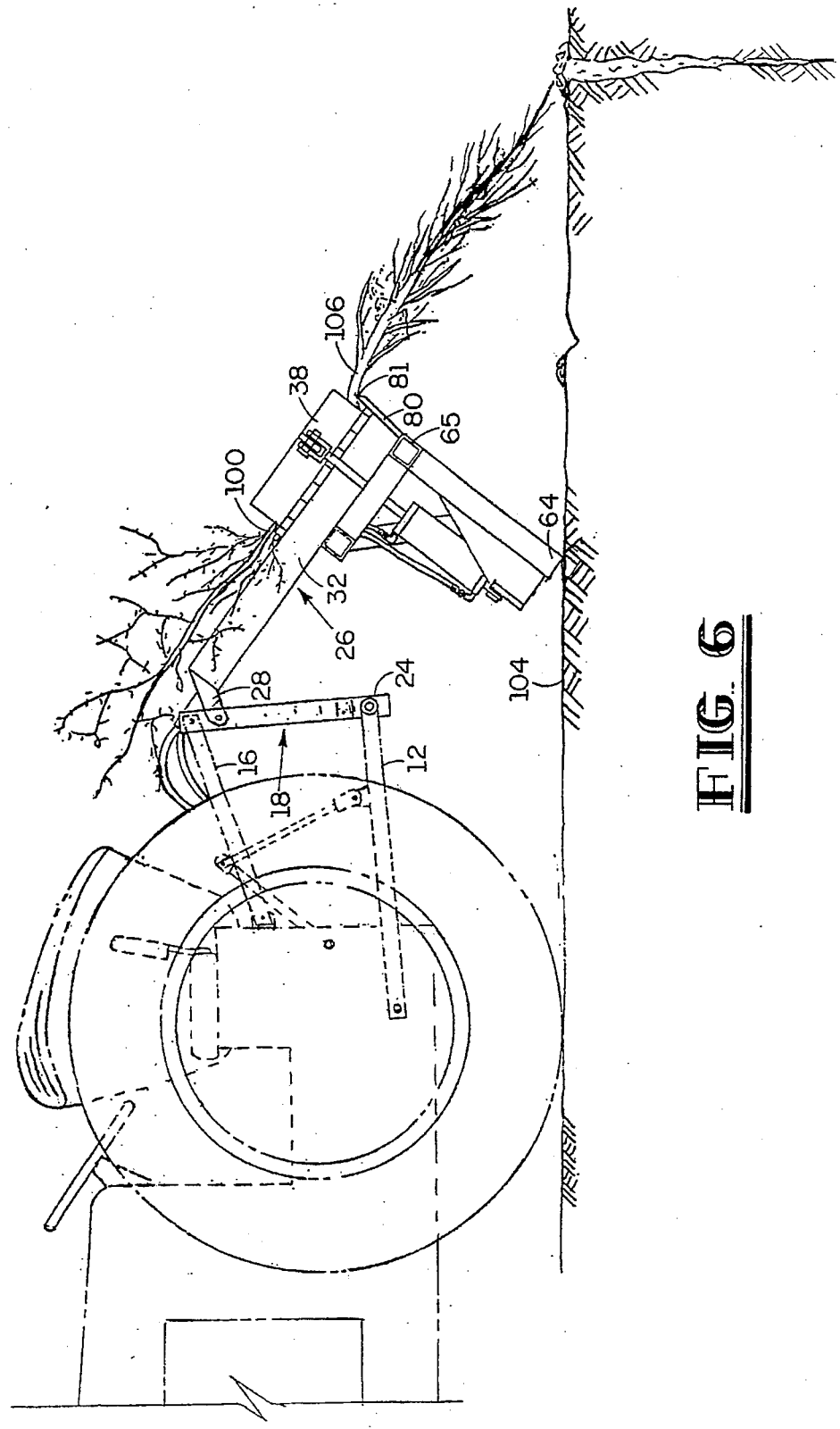
FIG. 6 is a perspective view which shows the present invention full levered and having fully extracted a plant.

In the initial engagement position the back side 44 of back member 32 is in contact with the base 24 of frame 18. The tractor is slowly driven forward as shown in FIGS. 4 through 6. In FIG. 4, it may be seen that apparatus 10 begins to rotate at pivot arm 28 with toe section 64 being forced against the ground 104. With plate 80 digging into base 102 of plant 100, plant 100 is initially lifted vertically to initiate removal of the plant. Back member 32 is drawn away from base 24 as this lever action begins. Because engagement face 52 of jaw 38 is substantially pressed flat against front face 42 of back member 32 with plant 100 held therebetween there is little or no slippage of plant 100 in jaw 38 as the rotation and extraction begins.

In FIG. 5 the tractor is shown having moved further forward. Toe section 64 continues to press against ground 104 as heel 65 is raised further above the ground. Rotation around pivot arm 28 continues as the tap root 106 of plant 100 is further extracted from the ground. Plate 80 with bevelled edge 81 continues to exert a holding force to ensure that plant 100 does not slip between jaw 38 and back 32, as can be seen in FIG. 5. It should be noted that no lifting is being done by the three-point hitch mechanism (12, 14, and 16); therefore, the front end of the tractor is not lifted or forced upwardly. Neither is the plant 100 being pulled merely in a forward or horizontal direction. By use of the present invention both vertical and horizontal force components are imparted to the extraction process.

FIG. 6 illustrates the entire root 106 withdrawn as the tractor has moved even further forward. Puller assembly 26 has pivoted about arm 28 and is raised high on toe section 64. Plants with tap roots as long as 5 feet have been pulled in this manner with this invention.

Figure 7:
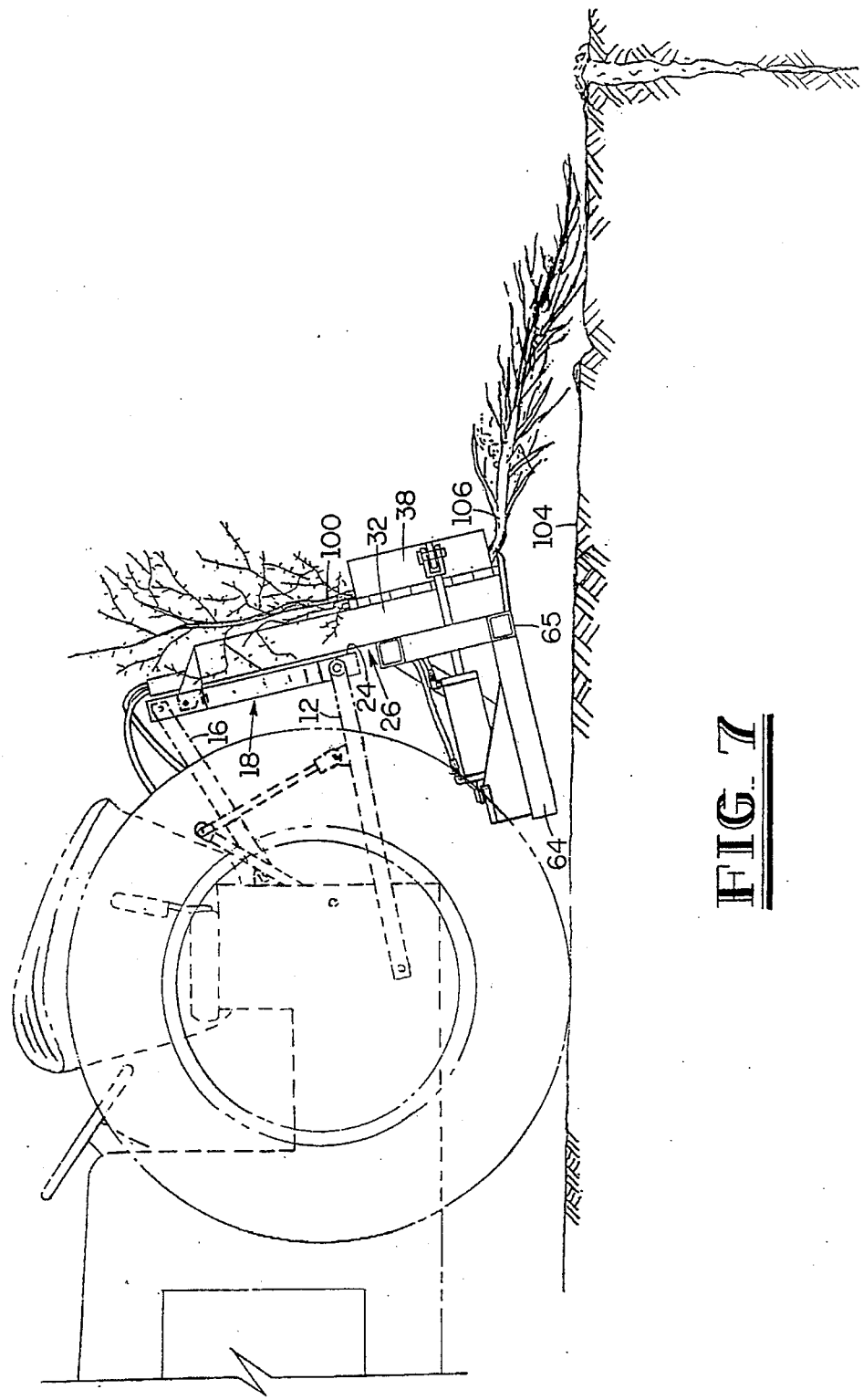
FIG. 7 illustrates the present invention with the toe lifted slightly above the ground by the three-point hitch assembly, and the puller assembly against the frame.

Now that the plant 100 is essentially extracted, the three-point hitch mechanism is operated to lift toe section 64 off of the ground and puller assembly 26 freely swings forward (pivoting about arm 28) and abuts against base 24, as shown in FIG. 7. Jaw 38 is opened by the retraction of cylinder arm 68 and the extracted plant is released for subsequent pickup.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. An apparatus for extracting brush releasably attachable to a tractor, said tractor having a three-point hitch lifting mechanism, said mechanism, having lower lift arms and an upper guide arm comprising:
   a means for attachment to said hitch mechanism, said attachment means having an elevated end attachable to said upper guide arm and a lower end attachable to each of said lower lift arms;
   a puller assembly attached at a pivot point to said attachment means only at said elevated end, said puller assembly further comprising;
      a means extending forward of and below said pivot point for levering said puller assembly about said pivot point as said tractor is moved forward; and
      a means mounted on said levering means for releasably grasping said brush.

2. The apparatus of claim 1 wherein said levering means further comprises:
   a back member;
   a foot portion attached to said back member; and
   a toe section on said foot portion.

3. The apparatus of claim 2 wherein said grasping means further comprises a movable jaw hingedly attached to said back member; and a means attached to said foot portion for actuating said jaw member.

4. The apparatus of claim 3 wherein said means for attachment to said hitch mechanism further comprises a triangular frame attached at an upper peak at said elevated end to said guide arm and attached at a base at said lower end to each of said lower lift arms.

5. The apparatus of claim 3 wherein said puller assembly is generally reverse L-shaped with said toe section extending forward and below said pivot point and said back member further comprises a pivot arm extending from an upper portion of said back member to said pivot point.

6. The apparatus of claim 3 wherein said grasping means further comprises a plate attached at a first end to a bottom of said back member, said plate tilted slightly downward and having an upwardly beveled second end.

7. An apparatus for extracting brush releasably attachable to a tractor, said tractor having a three-point hitch lifting mechanism, said mechanism, having lower lift arms and an upper guide arm comprising:
   a means for attachment to said hitch mechanism, said attachment means having an elevated end attachable to said upper guide arm and a lower end attachable to each of said lower lift arms, said means for attachment to said hitch mechanism further comprising a frame attached at an upper connector at said elevated end to said guide arm and attached at a base connector at said lower end to each of said lower lift arms;
   a puller assembly attached at a pivot point to said attachment means at said elevated end, said puller assembly further comprising:
      a means extending forward of and below said pivot point for levering said puller assembly as said tractor is moved forward, said levering means further comprising:
         a back member;
         a foot portion attached to said back member; and
         a toe section on said foot portion; and
      a means mounted on said levering means for releasably grasping said brush said grasping means further comprising a movable jaw hingedly attached to said back member; and a means attached to said foot portion for actuating said jaw member.

8. The apparatus of claim 7 wherein said grasping means further comprises:
   a movable jaw hingedly attached to said back member; and a means attached to said foot portion for actuating said jaw member, a plate attached at a first end to a bottom of said back member, said plate tilted slightly downward and having an upwardly beveled second end.

* * * * *